US010703057B2

(12) United States Patent
Kaiser et al.

(10) Patent No.: US 10,703,057 B2
(45) Date of Patent: Jul. 7, 2020

(54) DEPOSITING DEVICE FOR FIBER ROVINGS

(71) Applicants: VOITH PATENT GMBH, Heidenheim (DE); AUDI AG, Ingolstadt (DE)

(72) Inventors: Michael Kaiser, Kirchseeon (DE); Manfred Burkhard, Diessen/OT Dettenschwang (DE); Marco Goettinger, Kirchseeon (DE); Andreas Proehl, Freising (DE)

(73) Assignees: Voith Patent GmbH, Heidenheim (DE); Audi AG, Ingolstadt (DE)

(*) Notice: Subject to any disclaimer, the term of this patent is extended or adjusted under 35 U.S.C. 154(b) by 1 day.

(21) Appl. No.: 16/061,044

(22) PCT Filed: Dec. 7, 2016

(86) PCT No.: PCT/EP2016/080032
§ 371 (c)(1),
(2) Date: Jun. 11, 2018

(87) PCT Pub. No.: WO2017/097818
PCT Pub. Date: Jun. 15, 2017

(65) Prior Publication Data
US 2018/0361688 A1 Dec. 20, 2018

(30) Foreign Application Priority Data
Dec. 9, 2015 (DE) ........................ 10 2015 224 689

(51) Int. Cl.
*B29C 70/00* (2006.01)
*D04H 3/00* (2012.01)
(Continued)

(52) U.S. Cl.
CPC ............ *B29C 70/56* (2013.01); *B29C 70/207* (2013.01); *B29C 70/382* (2013.01);
(Continued)

(58) Field of Classification Search
None
See application file for complete search history.

(56) References Cited

U.S. PATENT DOCUMENTS

| 4,569,716 | A | * | 2/1986 | Pugh | ................... B29C 66/1122 156/510 |
| 6,827,118 | B2 | | 12/2004 | Wienands et al. | |
| 8,808,490 | B2 | * | 8/2014 | Hagman | ............... B29C 70/388 156/263 |
| 9,364,997 | B2 | | 6/2016 | Goettinger et al. | |
| 9,597,842 | B2 | * | 3/2017 | Borgmann | ............ B29C 70/386 |

(Continued)

FOREIGN PATENT DOCUMENTS

| DE | 10031836 A1 | 1/2002 |
| DE | 102004047646 A1 | 4/2006 |

(Continued)

*Primary Examiner* — Linda L Gray
(74) *Attorney, Agent, or Firm* — Laurence A. Greenberg; Werner H. Stemer; Ralph E. Locher

(57) ABSTRACT

A device for producing textile planar structures formed of a plurality of portions deposited beside one another of fiber rovings. A supply device provides a fiber rovings at a transfer installation. A plurality of path guiding rails are disposed beside one another and above the depositing face. A gripper unit and a cutting unit are disposed on each path guiding rail. Each gripper unit and each cutting unit is movable and positionable along the path guiding rail independently of the gripper units and cutting units of the other path guiding rails. The gripper units grab the fiber roving from the transfer installation and move their free end to a desired terminal position. The cutting units severs the rovings at a cutting position. The gripper units and the cutting units have a downholder for pressing the fiber roving against the depositing face.

18 Claims, 11 Drawing Sheets

(51) Int. Cl.
*B29C 70/56* (2006.01)
*B29C 70/38* (2006.01)
*B29C 70/54* (2006.01)
*B29C 70/20* (2006.01)
*D04H 3/04* (2012.01)

(52) U.S. Cl.
CPC ............ *B29C 70/545* (2013.01); *D04H 3/04* (2013.01); *B29C 2793/0027* (2013.01); *B29C 2793/0081* (2013.01); *Y10T 156/1062* (2015.01); *Y10T 156/1074* (2015.01); *Y10T 156/1077* (2015.01); *Y10T 156/125* (2015.01); *Y10T 156/1317* (2015.01); *Y10T 156/1343* (2015.01); *Y10T 156/1348* (2015.01)

(56) References Cited

U.S. PATENT DOCUMENTS

| | | | |
|---|---|---|---|
| 2006/0162143 A1* | 7/2006 | Nelson | B29C 70/202 29/431 |
| 2013/0118683 A1* | 5/2013 | Nelson | B29C 70/202 156/250 |
| 2015/0210018 A1 | 7/2015 | Lang et al. | |
| 2017/0008197 A1 | 1/2017 | Baeurle et al. | |

FOREIGN PATENT DOCUMENTS

| | | |
|---|---|---|
| DE | 102009042384 A1 | 4/2011 |
| DE | 102014201060 A1 | 7/2015 |
| EP | 2227373 A2 | 9/2010 |
| WO | 2009077581 A2 | 6/2009 |
| WO | 2012136394 A1 | 10/2012 |

\* cited by examiner

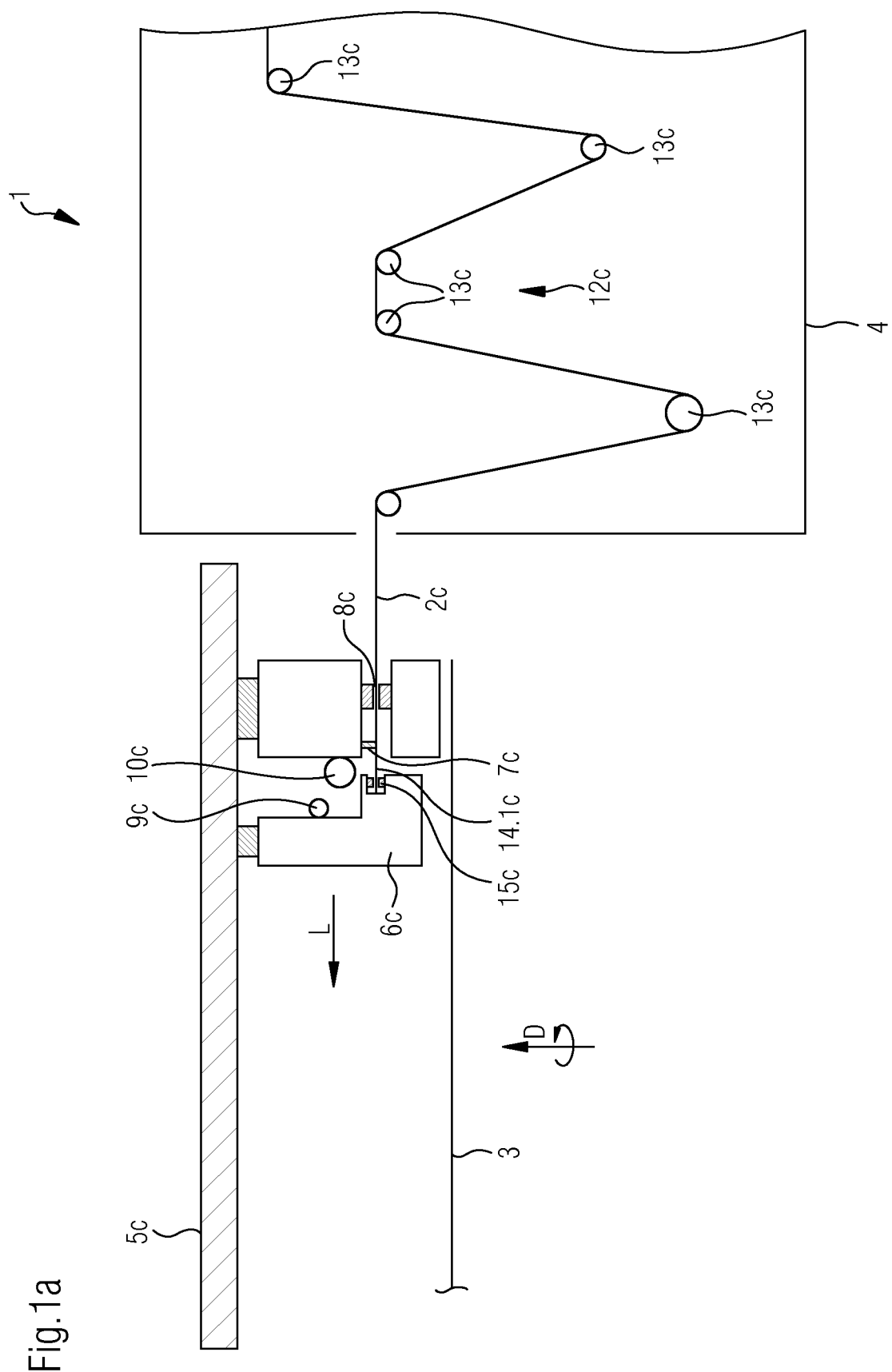

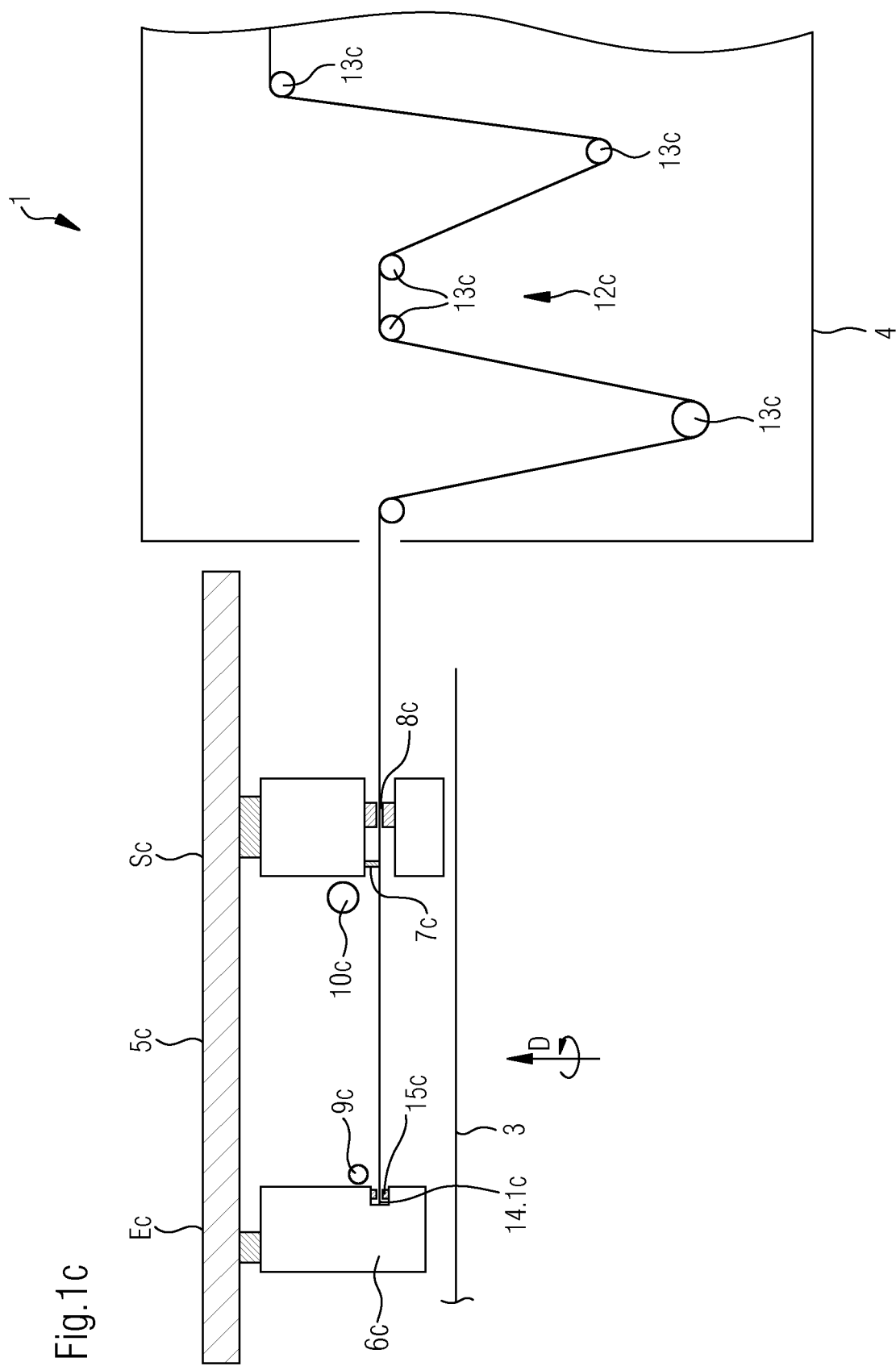

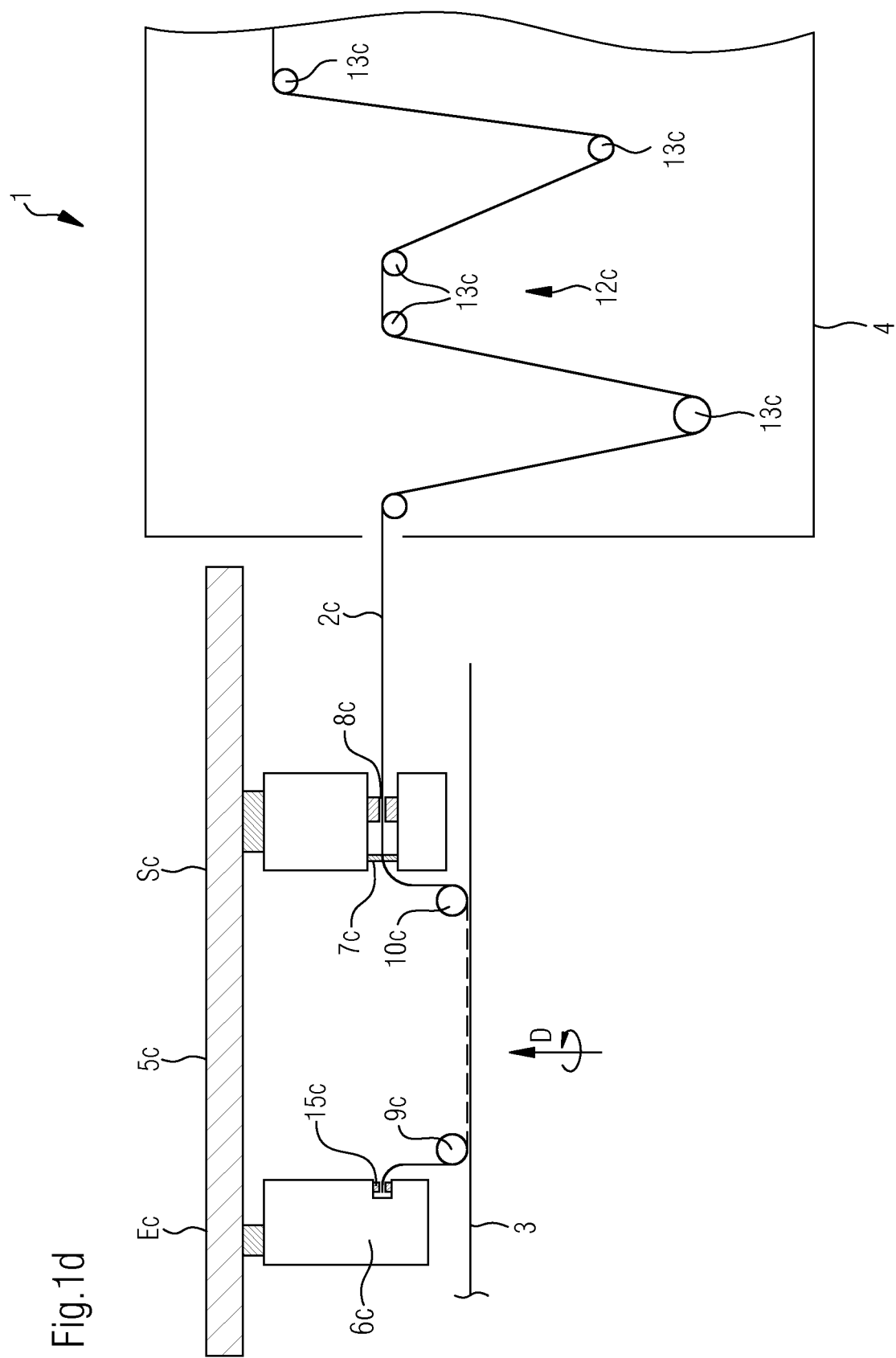

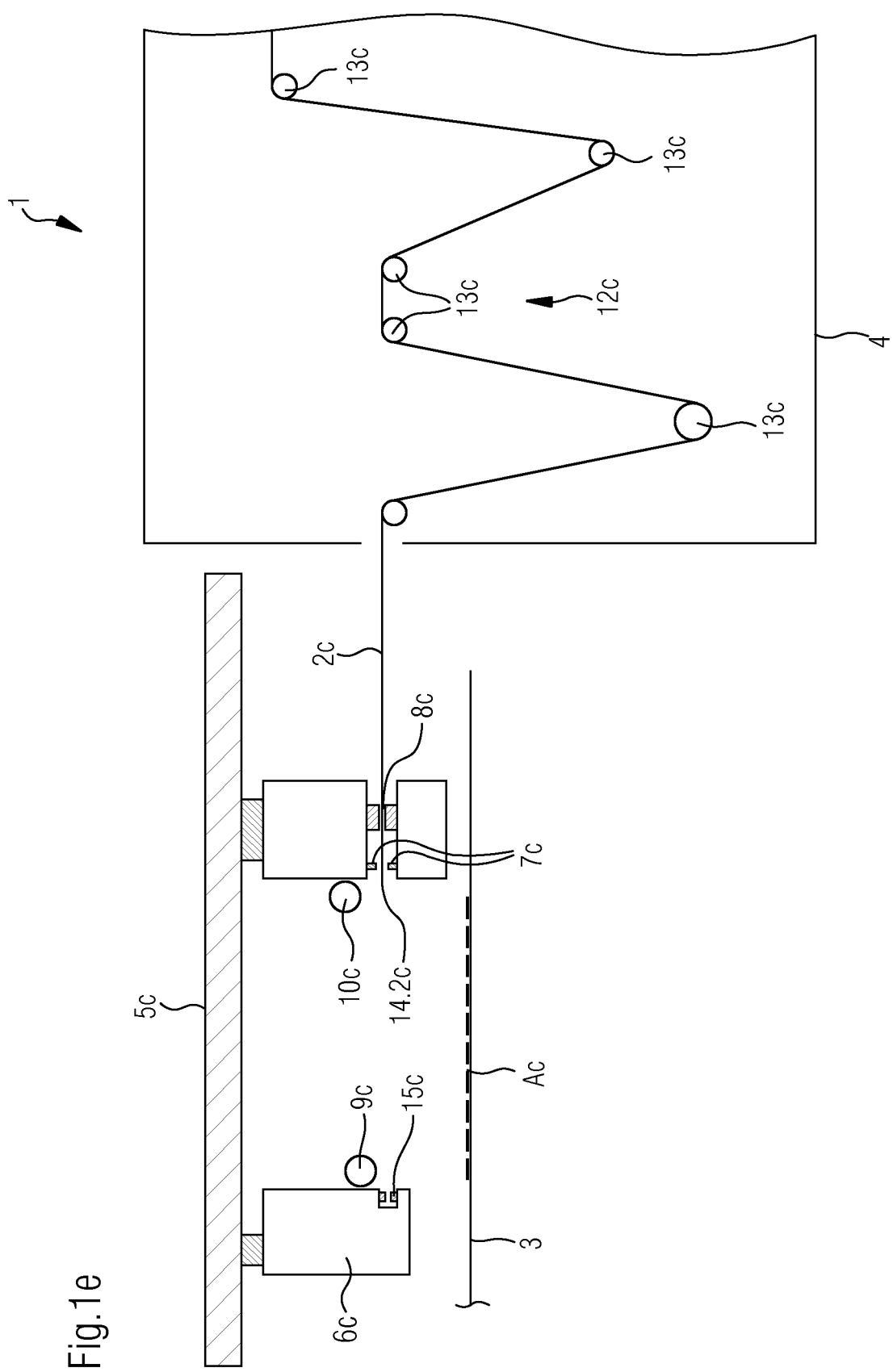

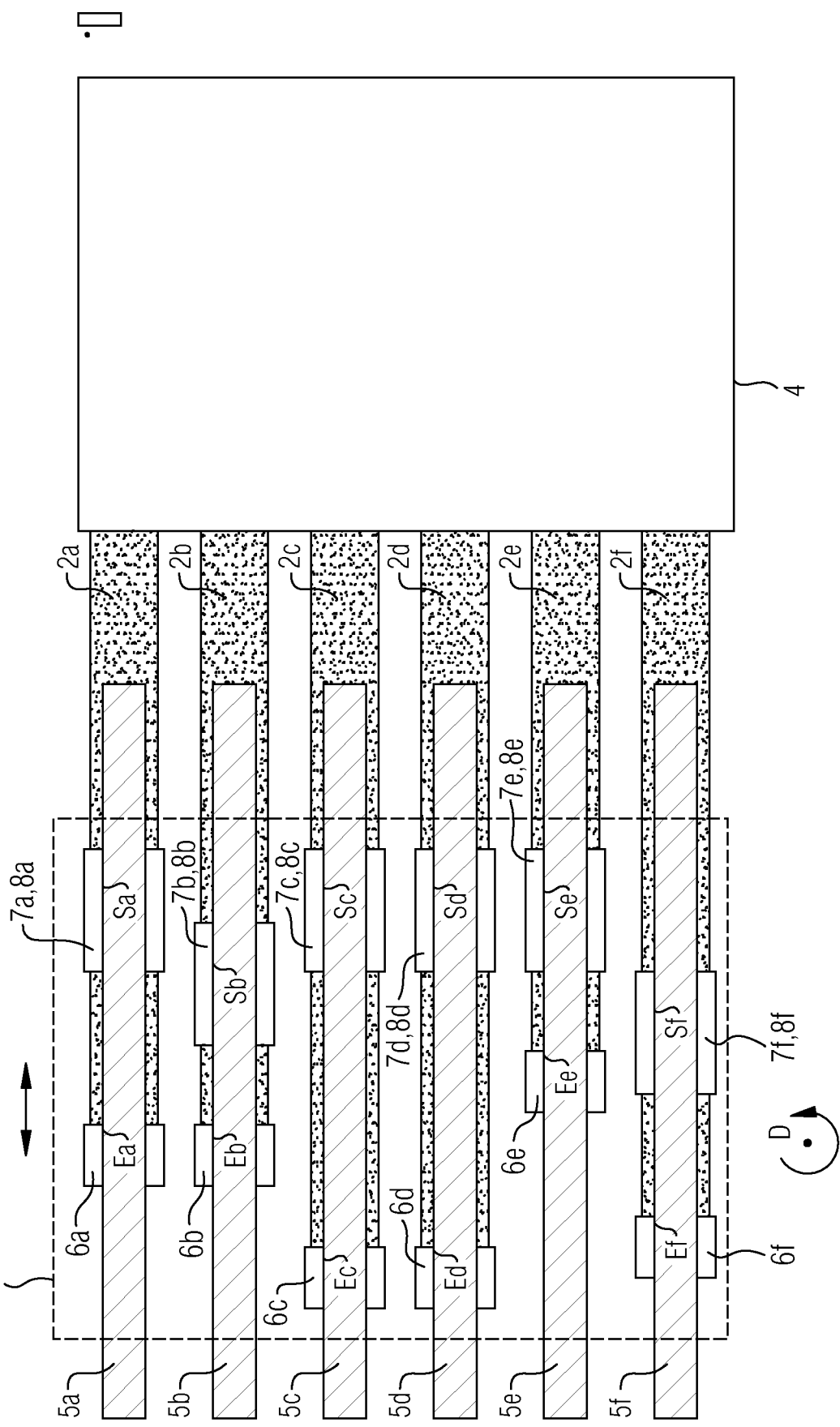

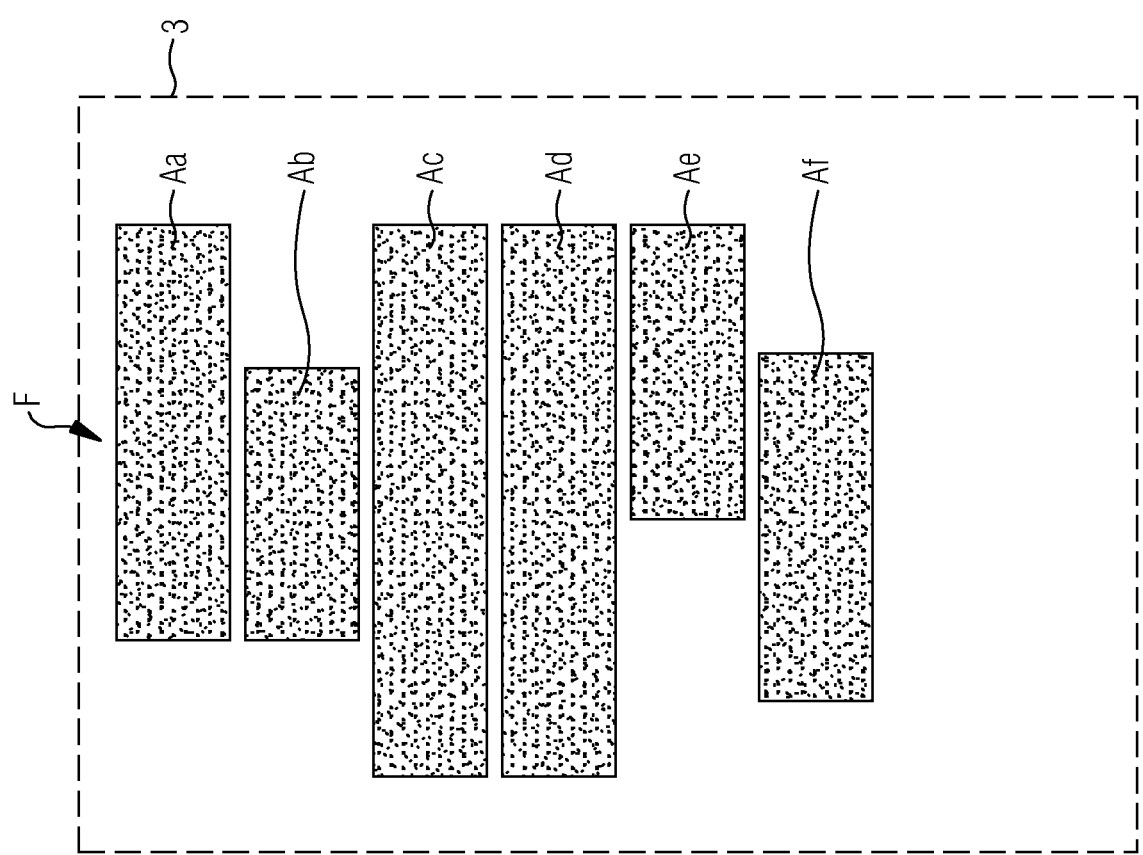

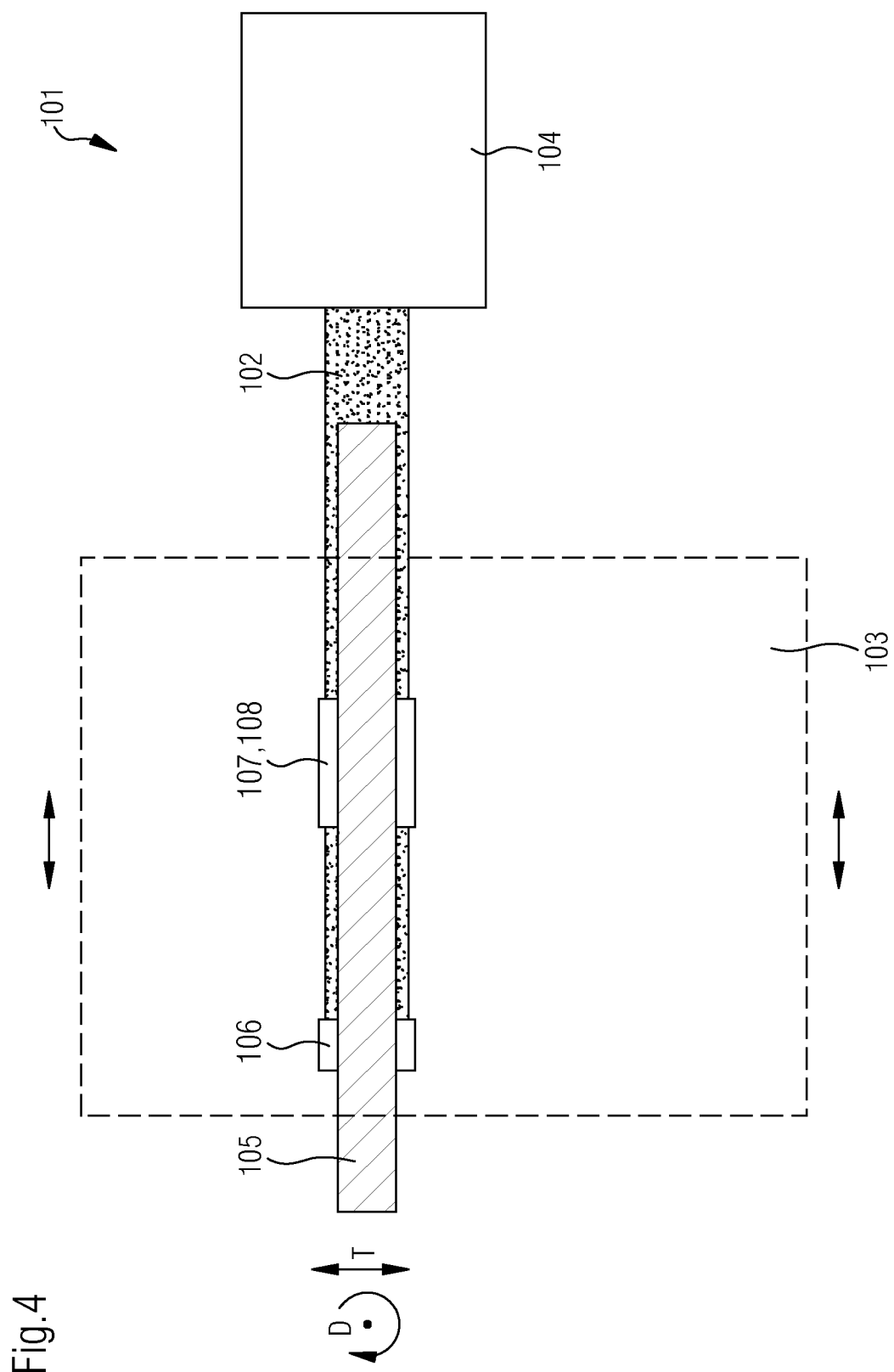

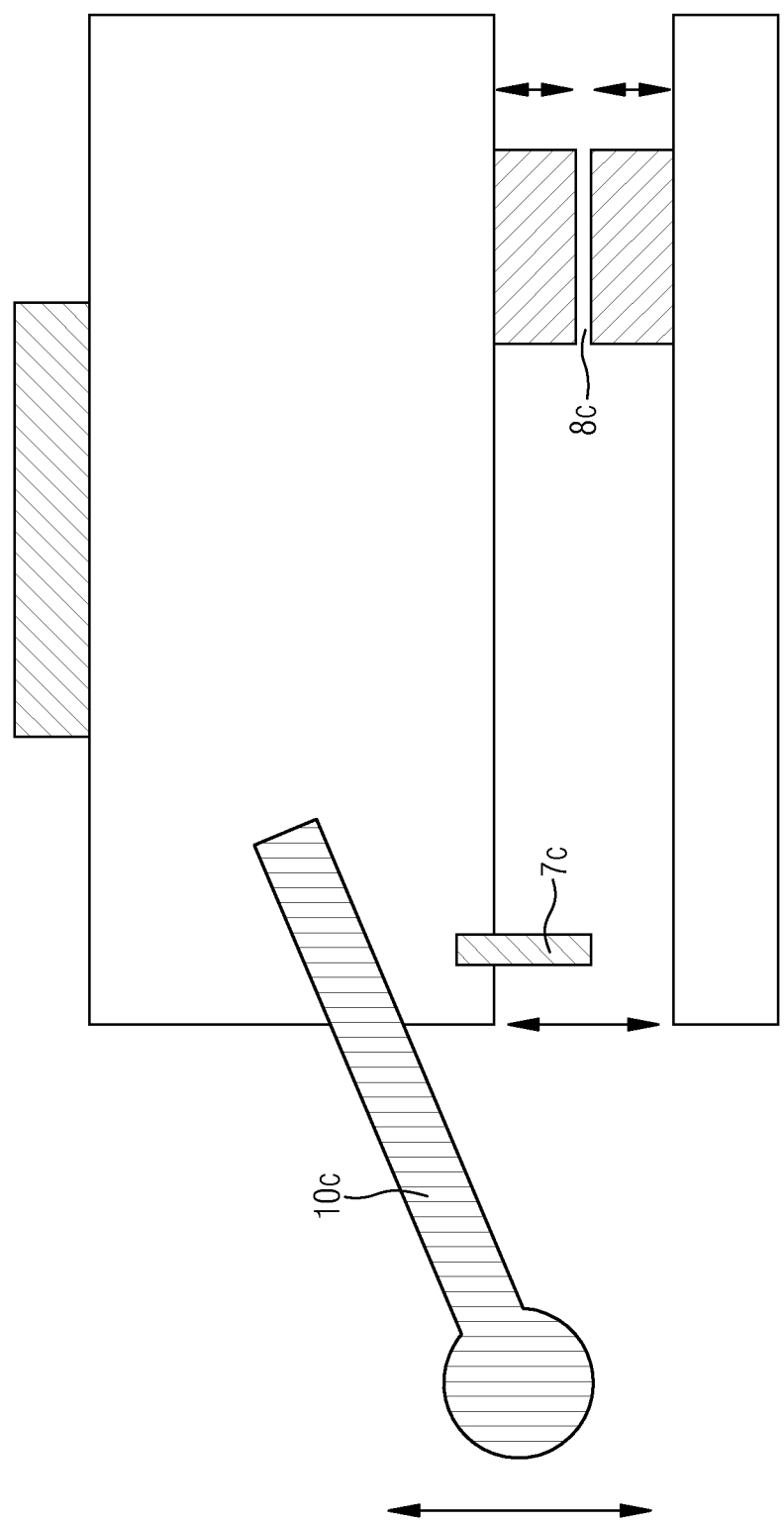

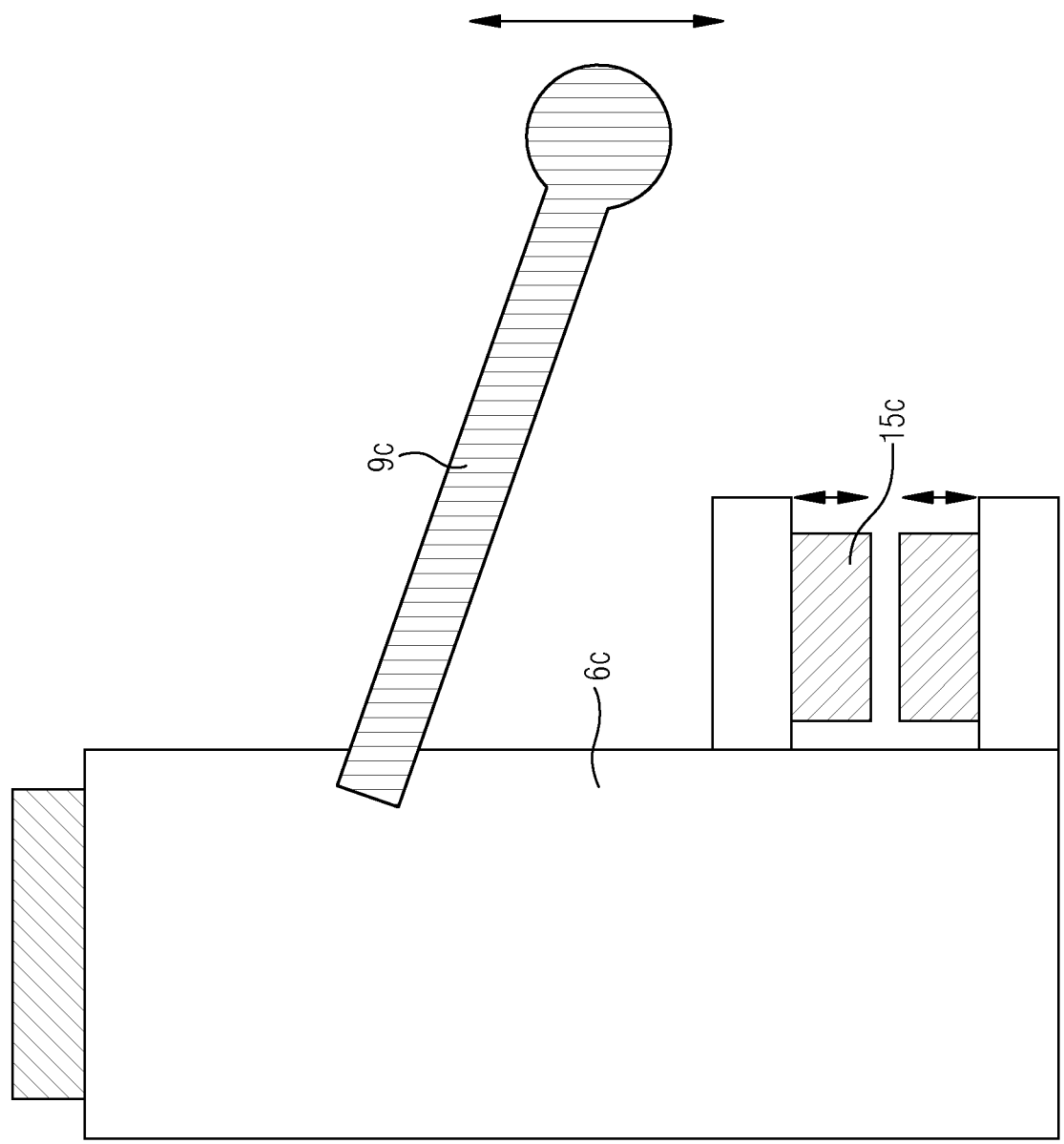

DEPOSITING DEVICE FOR FIBER ROVINGS

BACKGROUND OF THE INVENTION

Field of the Invention

The invention relates to a device for the production of textile planar structures which comprise a plurality of portions deposited beside one another of fiber rovings.

Devices for the production of textile planar structures, in the case of which fiber rovings are deposited beside one another and optionally on top of one another on a depositing face so as to produce textile planar structures which are used, for example, as a fibrous armor for fiber-reinforced plastics components such as, for example, glass fiber reinforced plastics (GFRP) components, or carbon fiber reinforced plastics (CFRP) components, are known from the prior art.

Such a device is known, for example, from DE 10 2009 042 384. In the case of this device, individual fiber roving portions are deposited beside one another by means of gripper units on a transportation belt which moves obliquely to the depositing direction of the fiber roving portions. The textile planar structure that is created therefrom is web-shaped and in a subsequent step still has to be cut so as to correspond to the final contour of the component to be produced. This subsequent trimming step is complex and causes much cutting waste and thus scrap of the expensive fiber material.

A device by means of which fiber roving portions are deposited on a depositing face by means of a plurality of gripper units that are disposed beside one another is furthermore known from WO2012/136394. The gripper units here are capable of being controlled individually of one another and the terminal positions thereof are capable of being set independently of one another. By way of this device, it is possible for the cutting waste to be reduced and for the textile planar structure to be produced in a shape that is closer to the final contour of the component to be fabricated, as is possible by way of the device described in DE 10 2009 042 384. The handling when depositing the fiber roving portions on the depositing face on account of slippage and the still relatively sizeable cutting waste in terms of fiber material in order for the desired shape of the textile planar structure to be produced according to the desired final contour of the component to be produced are disadvantageous in the device disclosed in WO'394.

It is therefore the object of the present invention to propose a device by means of which the production of the textile planar structure is further improved in terms of handling properties and by means of which the textile planar structure is producible in a shape that approximates the final contour with as little cutting waste as possible.

The object is achieved by a device having the features as claimed.

It is provided according to the invention that the device comprises:
- a depositing face on which the portions of at least one fiber roving are deposited; in particular, the depositing face is configured as a table, preferably movable laterally and/or as a lifting table and/or as a rotary table;
- a supply device for providing a plurality of fiber rovings and/or a plurality of transfer installations for providing the free end of the respective fiber roving;
- a plurality of path guiding rails, which are disposed above the depositing face, on which in each case one gripper unit and in each case one cutting unit are disposed, wherein the each gripper unit is movable and positionable along the respective path guiding rail and is conceived such that said gripper unit is suitable:
  - for gripping the free end of a fiber roving that is assigned to the gripper unit and acquiring the free end from the transfer installation;
  - for erecting the assigned fiber roving above the depositing face in that the gripper unit, while the latter keeps hold of the free end, moves along the path guiding rail in a relative manner away from the transfer installation up to a desired terminal position and herein a tensile force is exerted on the fiber roving in the longitudinal direction thereof; and
  - for releasing and depositing the free end on the depositing face at the terminal position of the gripper;
- at least one cutting unit for severing at least one of the erected fiber rovings at a cutting position in order for the portion of the respective fiber roving to be configured, wherein the cutting position in the erected state of the fiber roving that is assigned to the gripper unit is disposed between the transfer installation and the terminal position of the gripper unit;
- wherein each of the gripper units comprises a downholder, by way of which the fiber roving, or the fiber rovings, respectively, in the region of the respective terminal position can be pressed against the depositing face;
- and wherein each of the cutting units comprises a downholder, by way of which the fiber roving, or the fiber rovings, respectively, in the region of the cutting position can be pressed against the depositing face. The handling when depositing the respective free end of the fiber roving is significantly improved on account of the downholders, since said free end can thereby be deposited on the depositing face in a defined manner under tension and without slippage.

The device according to the invention is furthermore characterized in that path guiding rails are provided on which in each case one cutting unit is disposed additionally to the respective gripper unit, wherein the gripper unit and the cutting unit of the path guiding rail are collectively assigned one of the fiber rovings so as to process, that is to say, for example, to grip, to stretch, and to sever, this collectively assigned fiber roving, and wherein the gripper unit and the cutting unit of a path guiding rail are movable and positionable along the path guiding rail in a mutually independent manner. In order for the embodiment not to be allowed to become too complicated, it is preferable for the gripper unit and the cutting unit to be disposed sequentially on the path guiding rail such that the gripper unit and the cutting unit cannot overtake one another.

Path guiding rail in the context of the invention is understood to be a guide rail which guides the gripper units and cutting units that are movably disposed thereon and thus predefines the path of said gripper units and cutting units for potential movements.

By way of said device, a method for the production of textile planar structures having a plurality of portions deposited beside one another of a plurality of in particular unidirectional fiber rovings is in particular capable of being carried out, said method comprising the following steps:
- providing a depositing face for depositing the portions of the fiber rovings;
- providing a supply device for providing the fiber rovings and at least one transfer installation for providing the free end of the fiber rovings;
- providing the path guiding rails, which are disposed above the depositing face, on which in each case one gripper unit is disposed, wherein the gripper unit is movable and positionable along the path guiding rail, wherein the gripper unit carries out the following steps gripping or keeping hold of the free end of the fiber roving that is assigned to the gripper unit and acquiring the free end from the transfer installation;

erecting the fiber roving assigned to said gripper unit above the depositing face in that the gripper unit, while the latter keeps hold of the free end, moves along the path guiding rail thereof in a relative manner away from the transfer installation up to a desired terminal position and herein a tensile force is exerted on the assigned fiber roving in the longitudinal direction thereof; and releasing and depositing the free end onto the depositing face at the terminal position of the gripper;

providing in each case one cutting unit per path guiding rail, which carries out the step of severing the erected fiber roving that is assigned to the gripper unit at a cutting position that is disposed between the transfer installation and the terminal position of the gripper unit, in order for the portion of the respective fiber roving to be configured.

The method is characterized in that path guiding rails are provided on which in each case one cutting unit is disposed additionally to the gripper unit, wherein the gripper unit and the cutting unit of the path guiding rail are collectively assigned one of the fiber rovings so as to process this collectively assigned fiber roving, and wherein the gripper unit and the cutting unit of a path guiding rail are movable and positionable along the path guiding rail in a mutually independent manner.

It is to be noted in this context that when severing a fiber roving in order for the portion to be formed, a new free end of the fiber roving is formed again, said new free end again being held by the transfer installation and being able to be made available to the gripper unit in order for the next portion to be formed.

On account of the interaction between the gripper unit, the cutting unit and the transfer installation in the processing of the assigned fiber roving, portions of the fiber roving having a desired length can thus be generated from the fiber roving and these portions can be deposited on the depositing face at a desired location along the motion path of the respective path guiding rail. Since this is the case in particular for a plurality of fiber rovings, a plurality of such portions of fiber rovings, that is to say having in each case a desired length, can thereby be deposited beside one another and/or on top of one another at desired locations on the depositing face. A textile planar structure having a shape that approximates the contour, corresponding to that of the fiber composite component to be produced, can be achieved with little cutting waste as a result, said textile planar structure comprising a plurality of fiber roving portions that are deposited beside one another and/or on top of one another on the depositing face. The solution according to the invention thus enables textile planar structures which "approximate the final contour" to be produced in a resource-saving manner. Planar structures having multiple plies can be produced by depositing portions on top of one another multiple times.

The fibrous construction in terms of shape (for example the contour of a fender) as well as the orientation (the dissimilar alignment of the fibers in order for a component to be constructed so as to reflect the load paths) can be designed with the largest degree of freedom on account of the individual positioning of single unidirectional portions of the fiber strips, or fiber rovings, respectively. This means that there are no contours that have to be cut out of products on rolls (woven fabric/cross-laid structure/prepreg), but that the textile planar structure can be constructed directly so as to approximate the final contour, less cutting waste thus arising. Furthermore, local reinforcements, for example at particularly stressed force-introduction points, can also be positioned in a targeted manner.

In the context of this invention, the term fiber roving is to be understood as a bundle, strand, or multifilament yarn from filaments (continuous fibers) that are disposed in parallel. In particular, a fiber tape from a plurality of bundles disposed beside one another of fibers is also to be understood as a fiber roving herein. Such a fiber tape can be processed using a gripper unit. The term fiber roving in the context of the invention is to be widely interpreted and is in particular not limited to the fiber roving being present wound on a package. Furthermore, the terms fiber roving, fiber strips, or fiber tape are to be understood as equivalent in the context of the invention. Fiber rovings are composed of a multiplicity of individual filaments. Said fiber rovings are identified according to the number of the individual filaments, for example as 12K fiber rovings, this representing a fiber roving from 12,000 individual filaments, or for example as 50K fiber rovings, this representing a fiber roving from 50,000 individual filaments. These herein are preferably carbon fibers, glass fibers, or aramid fibers.

It is furthermore to be noted that the fiber roving can be one that is either dry or is provided with a binding agent, or else is soaked or preimpregnated, respectively, with a matrix material. No differentiation in the terminology is made herein.

It is to be noted that in the context of the invention it is both possible that only a single transfer unit is provided, said single transfer unit providing the free ends of all fiber rovings to the respective grippers. In this case, there are a plurality of gripper units to which in each case one fiber roving is assigned (see preferred embodiment), or else each fiber roving or a group of fiber rovings is assigned a dedicated transfer unit such that each gripper unit acquires the free end of the fiber roving or of the group of fiber rovings from the transfer unit that is assigned to said fiber roving. In this case, there are a plurality of gripper units, to which in each case one fiber roving is assigned, wherein a fiber roving per se in the context of the invention can be composed of a plurality of fiber bundles.

It is furthermore to be noted that the claim feature that "the gripper unit, while the latter keeps hold of the free end, moves along the path guiding rail relative to the transfer installation away from the latter (the transfer installation) up to a desired terminal position" is to be understood to the extent that the relative movement between the gripper unit and the transfer unit is meant. This relative movement can be caused, for example, in that the gripper unit moves and the transfer installation does not move, the spacing therebetween being enlarged on account thereof. This relative movement can also be caused in that the gripper unit does not move and the transfer installation moves, the spacing therebetween being enlarged on account thereof. This relative movement can furthermore be caused in that the gripper unit and the transfer installation move relative to one another at dissimilar speeds and/or in dissimilar directions, the spacing therebetween being enlarged on account thereof.

The term gripper unit in the context of the invention is to be widely interpreted and is to describe a device by means of which the respective free end can be received, kept hold of, and released again. Potential mechanisms to this end can comprise keeping hold of the fiber roving by clamping, keeping hold of the fiber roving by suctioning by means of a vacuum source, keeping hold by means of adhesion, etc.

Advantageous design embodiments and refinements of the invention are stated in the dependent claims.

According to one particularly preferred design embodiment of the invention, it is provided that a plurality of path guiding rails, which in relation to the depositing face are disposed beside one another and are disposed above the depositing face, on which in each case one gripper unit and one cutting unit are disposed, are provided, wherein each gripper unit is movable and positionable along the path guiding rail thereof independently of the gripper units of the other path guiding rails, wherein each cutting unit is movable and positionable along the path guiding rail thereof independently of the cutting units of the other path guiding rails, wherein the gripper unit and cutting unit that are disposed on a respective path guiding rail are movable and positionable along the path guiding rail thereof in a mutually independent manner, and the gripper unit and cutting unit of a respective path guiding rail are collectively assigned in each case one fiber roving so as to process this collectively assigned fiber roving.

In the context of this embodiment, the following are accordingly provided in particular:
- a plurality of path guiding rails, which in relation to the depositing face are disposed beside one another, on which in each case one gripper unit and one cutting unit are disposed for collectively processing in each case one collectively assigned fiber roving; and
- a supply device for supplying the fiber rovings and at least one transfer installation for providing the free end of the respective fiber roving;
- wherein each of the gripper units is conceived for keeping hold of the fiber roving assigned thereto at the free end thereof and to release the free end again;
- wherein each of the gripper units is movable and positionable along the path guiding rail thereof independently of the gripper units of the other path guiding rails;
- wherein each of the cutting units is conceived for severing the assigned fiber roving;
- wherein each of the cutting units is movable and positionable along the path guiding rail thereof independently of the cutting units of the other path guiding rails;
- wherein the at least one transfer installation is conceived to keep hold of the assigned fiber rovings and to release them again;
- wherein the gripper unit and the cutting unit of the respective path guiding rail are movable and positionable along the path guiding rail thereof in a mutually independent manner; and
- wherein the gripper unit and the cutting unit of the respective path guiding rail, and the at least one transfer installation, are conceived so as to collaborate with one another in such a manner so as to
- erect the assigned fiber roving between the gripper unit and the transfer installation in that the gripper unit grips the free end and the transfer unit releases the latter while the gripper unit moves relative to the transfer installation away from the latter up to a terminal position; and
- to form from the fiber roving the portion having a desired length and to deposit said portion at a desired location on the depositing face in that the cutting unit severs the erected fiber roving at a cutting position that is disposed between the gripper unit and the transfer installation and the gripper unit releases the free end at the terminal position, wherein the desired length of the portion is determined by the spacing (along the length of the fiber roving) between the terminal position and the cutting position, and the desired location is determined by the terminal position and the cutting position relative to the depositing face.

On account of this embodiment, different portions can be formed simultaneously or at very short temporal intervals for a plurality of fiber rovings which are assigned to different gripper units, said portions being deposited one beside another on the depositing face. The productivity of the device according to the invention can thereby be significantly increased.

The path guiding rails run in particular so as to be mutually parallel such that the portions of the fiber rovings that are formed by the assigned gripper units and cutting units can be deposited beside one another in parallel in a simple manner. A design embodiment which is of simple construction provides in this context that the path guiding rails run so as preferably to be mutually parallel, particularly preferably linearly parallel with respect to one another. A further concrete design embodiment furthermore provides that the path guiding rails run in a plane which is parallel to the depositing face or which has at least one component that is parallel to the depositing face.

It is preferably provided that the desired terminal position of the gripper unit and/or the desired cutting position of the cutting unit, both the gripper unit and the cutting unit being disposed on the same path guiding rail, are respective disposed above the depositing face. It is ensured on account of these measures alone or in combination that the textile planar structure is completely deposited on the depositing face. It is thereby ensured that no portion of a fiber roving partially projects beyond the depositing face, this reducing the risk of the portions deposited on the depositing face slipping, and thus improving the handling by way of the device.

A control installation is preferably provided which controls the gripper units and cutting units of each of the plurality of path guiding rails independently of one another in such a manner that the cutting position and the terminal position can be or are approached for the respective assigned fiber roving so as to correspond to the desired length of the portion of the respective fiber roving and the position thereof on the depositing face. It is possible for the textile planar structure having the desired shape to be fully automatically produced by way of this control installation. It is in particular conceivable in this context that the control installation controls the depositing process and the cutting process of the gripper units and cutting units, in particular the individual positioning of the gripper units and cutting units, the mutual interaction of said gripper units and said cutting units, in particular with a view to releasing the free ends and severing the erected fiber roving or fiber rovings, respectively, the temporal sequence of the depositing of the individual portions of the fiber rovings on the depositing face, based on CAD data or freely programmable or machine-readable data of the strip position as an input parameter of the fiber composite component and/or textile planar structure to be produced.

Depending on the desired shape or contour, respectively, of the textile planar structure to be produced, in particular depending on whether and to which extent said textile planar structure is to be configured in a three-dimensionally curved manner, or is subsequently to be draped in a three-dimensional manner, respectively, it can be expedient for the depositing face to be configured flat or curved. It is also conceivable for the device according to the invention to be equipped with a replaceable depositing face such that the latter can be changed in a simple manner. This can be expedient, for example, when changing is to be performed between a flat and a curve depositing face, or else in order for the productivity to be increased, when for example the depositing face serves for transporting the textile planar structure that is formed thereon, so as to, for example, provide the textile planar structure to a subsequent processing step such as, for example, forming, without repositioning said textile planar structure on another support on the depositing face.

In order for the portions of the fiber rovings to be able to be deposited on top of one another relative to one another at various depositing angles in a simple manner, it is provided according to one particularly preferred design embodiment of the invention that the depositing face is rotatable about a rotation axis that runs obliquely, in particular perpendicularly, to said depositing face. On account of this measure, the depositing face is rotatable relative to the gripper units and cutting units that are movable in a translatory manner, on account of which a high degree of freedom when depositing the portions of the fiber rovings is created.

Alternatively or additionally, it can be provided that the depositing face is movable in a translatory manner relative to the path guiding rail or path guiding rails, respectively, wherein the direction of the translatory movement extends in particular obliquely, in particular perpendicularly, to the longitudinal direction of the at least one path guiding rail. The degrees of freedom when depositing the portions of the fiber rovings can thereby be further increased in particular in the case of the translatory mobility of the depositing face that is additional to the rotational mounting of the depositing face. The translatory mobility of the depositing face is advantageous in particular when the device comprises only a (single) path guiding rail having a gripper unit and a cutting unit, since the depositing face can thereby approach various positions relative to the path guiding rail and the plurality of portions can be deposited beside one another on the depositing face on account thereof.

It is preferably furthermore provided that the downholders of the gripper unit and of the cutting unit that are disposed on the same path guiding rail are conceived and controllable in such a manner that said downholders simultaneously press the fiber roving against the depositing face.

The downholders of the gripper units and/or the downholders of the cutting units are in particular configured such that said downholders can in each case simultaneously press all fibers of the assigned fiber roving onto the depositing face.

The gripper units are preferably conceived such that said gripper units can in each case simultaneously grip or clamp all fibers of the fiber roving assigned to said gripper units.

As has already been explained above, it can be possible for the device to comprise only a single transfer installation to which all fiber rovings are assigned, or else a plurality of transfer installations to which in each case one or a plurality of fiber rovings are assigned. In order for the flexibility when handling to be increased, it is particularly expedient for at least one of the cutting units to be assigned a dedicated transfer unit, in particular for all cutting units in each case to be assigned a dedicated transfer unit having a respective holding installation, for example in the form of a clamping installation, wherein the respective holding installation is conceived to keep hold of the free end of the respective assigned fiber roving and to release it again. It is particularly expedient in this context for the holding installations to be in each case controllable in a mutually independent manner. As has already been indicated, the holding installation can be embodied as a clamping installation which keeps hold of the respective assigned fiber roving by clamping. However, it is also conceivable for the holding installation to be operated by way of a vacuum and to keep hold of the assigned fiber roving by way of a vacuum.

A further, particularly preferred design embodiment of the invention that builds thereon provides that at least one of the cutting units and the assigned transfer unit are embodied as a functional group, in particular that all cutting units and the respective assigned transfer unit are in each case embodied as a functional group. The functional group comprising a cutting unit and a transfer unit is movable and positionable along the respective path guiding rail herein independently of the functional groups of the other path guiding rails.

Furthermore, the functional group comprising the cutting unit and the transfer unit is movable and positionable along the respective path guiding rail independently of the gripper unit of said path guiding rail.

A further design embodiment of the invention provides that the holding installation keeps hold of the free end of the fiber roving or the fiber rovings, respectively, until said free end is gripped by the assigned gripper unit.

The interaction between a gripper unit having a downholder, a cutting unit having a downholder, and a transfer unit having a holding installation, that are disposed on the same path guiding rail, can be performed as follows, for example:

The gripper unit erects the fiber roving in a unidirectional direction above the depositing face. To this end, the gripper unit collects the free end of the fiber roving or fiber tape from the transfer installation. The holding installation is opened and the fiber tape on account thereof is released for drawing off, while the gripper unit moves away from the functional group having the cutting unit and the transfer installation. The fiber tape is optionally tensioned by way of a further installation which is to be explained later. The gripper unit and the functional group having the cutting unit and the transfer installation move to a respective depositing position and the two downholders, that is to say the downholder of the gripper unit and the downholder of the cutting unit, press the fiber tape onto the depositing face which has optionally been moved upward. The cutting unit severs the fiber tape at the cutting position, on account of which the fiber tape portion is formed. The holding installation has closed prior to severing, in order to keep hold of the fiber tape prior to severing. The gripper unit subsequently or simultaneously, respectively, opens and the portion formed of the fiber tape lies on the depositing face.

It is preferably provided that part of the fiber roving is retrieved from the supply device when the gripper unit, having the free end of the fiber roving kept hold of, moves in a relative manner away from the transfer installation up to a desired terminal position and a tensile stress herein is exerted on the fiber roving. In this case, a partial retrieval of the fiber roving from the supply device can be simultaneously caused by the erection procedure of the fiber roving.

A concrete design embodiment of the invention furthermore provides that the supply device comprises at least one unwinding station, from which the fiber roving or fiber rovings, respectively, that is/are present in a wound form are/is unwindable. Each unwinding station herein is in particular assigned one fiber roving that is wound onto a package. The unwinding station or unwinding stations, respectively, can comprise, for example, a creel for mounting and for unwinding the individual fiber rovings that are wound onto packages.

The supply device preferably has a tension control and/or regulating installation, by way of which the tensile stress of the individual fiber tapes is capable of being individually regulated and/or controlled.

According to one particularly preferred design embodiment of the invention, the supply device furthermore comprises a buffer storage that is assigned to the respective fiber roving, said buffer storage when viewed in the longitudinal direction of the fiber roving being disposed between the transfer installation and the unwinding station of the fiber roving. The buffer storage herein is conceived to delink the cyclical drawing-off of the fiber roving by the gripper unit from the unwinding of the fiber roving by the unwinding station which is performed at an almost constant speed. As a result, that part of the fiber roving that is unwound from the unwinding station is thus accumulated in the buffer storage and can be retrieved from the buffer storage by the cyclically operating gripper unit. There are various possibilities for the concrete configuration of the buffer storage. The buffer storage in one form that is simple in terms of construction but very effective can comprise an arrangement of at least two rows of deflection rollers about which the fiber roving is guided in an alternating and meandering manner about a deflection roller of the one row and about a deflection row of the other row, wherein the two rows of deflection rollers are urged apart from one another by the force of springs and/or weight. When part of the fiber roving is unwound from the unwinding station and is guided into the buffer storage, the two rows of deflection rollers are diverged, this being caused by the force of springs and/or weight. The distance between the rows of deflection rollers is enlarged by the divergence, and the buffer storage can receive more of the fiber roving. In the retrieval of part of the fiber roving from the supply device by the gripper unit when the fiber roving is erected, a tensile stress is exerted on the fiber roving, on account of which the spacing between the two rows of deflection rollers is reduced. The buffer storage can simultaneously serve as a tension control and/or regulating installation for controlling and regulating the tensile stress of the fiber roving. The idea of the buffer storage can also be an independent aspect of the invention and therefore subject matter of an independent patent claim.

In order for the subsequent handling of the textile planar structure that is formed from the deposited portions of the fiber roving or the fiber rovings, respectively, to be improved, it is expedient for the individual fibers of the fiber roving or the fiber rovings, respectively, and the various portions deposited beside one another of the fiber roving or the fiber rovings, respectively, to be mutually fixed by means of a binding agent. The application of the binding agent herein can be performed on the textile planar structure already formed, or else on the fiber roving or fiber rovings, respectively, prior to the textile planar structure being formed. To this end, it can be particularly expedient for the supply device to comprise a binder agent application device by means of which the binding agent, for example in liquid or particularly pulverulent form, is capable of being applied to the at least one fiber roving prior to the at least one fiber roving departing the supply device. In order for the adhesion of the binding agent on the fiber roving or the fiber rovings, respectively, to be improved, it is particularly expedient for the supply device to comprise a heating device that is disposed downstream of the binding agent application device, by means of which heating device the binding agent applied is capable of being fused.

BRIEF DESCRIPTION OF THE SEVERAL VIEWS OF THE DRAWING

The invention will yet be furthermore explained by means of schematic drawings in which

FIG. 2 shows the device of FIG. 1 in a plan view from above onto the depositing face;

FIG. 3 shows a first tier of a textile planar structure produced by the device according to the invention of FIGS. 1 and 2;

FIG. 4 shows a further device according to the invention in a plan view from above onto the depositing face; FIG. 6 is a diagrammatic view of a cutting unit; and FIG. 7 is a diagrammatic view of a gripper unit.

Description of the Invention

Figure 1B:
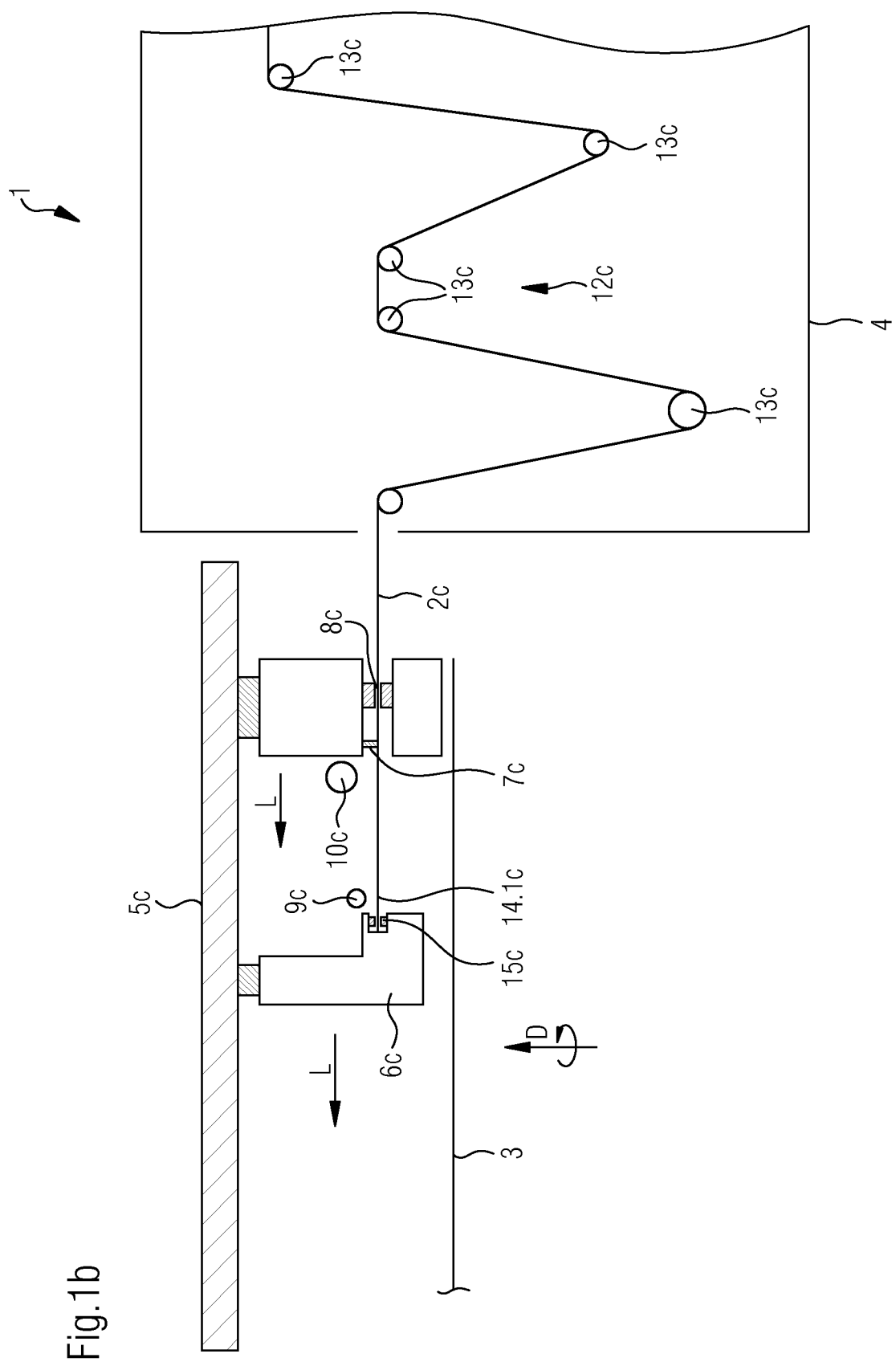
FIG. 1 shows a device according to the invention in a side view in various positions in the formation of a portion of a fiber roving.

FIGS. 1 and 2 show a first embodiment of a device 1 according to the invention in a side view and in a plan view. The device 1 is conceived to produce textile planar structures which comprise a plurality of portions deposited beside one another of a plurality of unidirectional fiber rovings 2a-2f. FIG. 1 shows the device 1 in the region of the fiber roving 2c.

As can be seen from the illustration of FIGS. 1 and 2, the device 1 comprises a depositing face 3 onto which the portions of the fiber rovings 2a-2f are deposited. The depositing face 3 is presently configured so as to be flat and is mounted so as to be rotatable about a rotation axis D that runs perpendicularly to said depositing face.

The device 1 furthermore comprises a supply device 4 for providing the fiber rovings 2a-2f, and for each of the fiber rovings 2a-2f one transfer installation 8a-8f for providing the free end 14.1a-14.1f of the respective fiber roving 2a-2f. The supply device 4 presently comprises a plurality of unwinding stations 12c, each comprising an arrangement of rolls 13c, each of the unwinding stations being assigned one fiber roving 2a-2f and from which unwinding stations the fiber roving 2a-2f that is present in a wound-up form is unwindable.

The unwinding stations furthermore have in each case one tension control and/or regulating installation for regulating and/or controlling the tensile stress of the assigned fiber roving 2a-2f, wherein in particular the tensile stress for each fiber roving is capable of being independently regulated and/or controlled.

The device 1 furthermore comprises a plurality of path guiding rails 5a-5f which in relation to the depositing face 3 are disposed beside one another and are disposed above the depositing face 3, in each case one gripper unit 6a-6f and one cutting unit 7a-7f being assigned to said path guiding rails. Each pair of a gripper unit 6a-6f and a cutting unit 7a-7f which is collectively disposed on one of the path guiding rails 5a-5f is assigned one of the fiber rovings 2a-2f for collective processing. For example, the gripper unit 6c and the cutting unit 7c of the path guiding rail 5c are thus assigned the fiber roving 2c for collective processing. Furthermore, each path guiding rail 5a-5f is assigned one of the transfer installations 8a-8f for providing the free end 14.1a-14.1f of the respective fiber roving 2a-2f. The cutting unit 7a-7f and the transfer unit 8a-8f that are assigned to a respective path guiding rail 5a-5f are presently embodied in each case as a as a functional group.

As can be seen from the illustration of FIG. 1, each of the gripper units 6a-6f is conceived to keep hold of the assigned fiber roving 2a-2f at the free end 14.1a-14.1f thereof and to release the free end 14.1a-14.1f again. Furthermore, each of the gripper units 6a-6f is movable and positionable along the path guiding rail 5a-5f thereof independently of the gripper units 6a-6f of the other path guiding rails 5a-5f. Furthermore, each of the cutting units 7a-7f is conceived to sever the assigned fiber roving 2a-2f, wherein each of the cutting units 7a-7f is movable and positionable along the path guiding rail 5a-5f thereof independently of the cutting units 7a-7f of the other path guiding rails 5a-5f. Furthermore, each of the transfer installations 8a-8f is conceived to keep hold of the assigned fiber roving 2a-2f and to release it again. Moreover, the gripper unit 6a-6f and the cutting unit 7a-7f of the respective path guiding rail 5a-5f is movable and positionable along the path guiding rail 5a-5f thereof in a mutually independent manner.

Furthermore, the path guiding rails 5a-5f run so as to be linearly parallel in a plane which is parallel to the depositing face 3.

As can be derived from the illustration of FIG. 1, each gripper unit 6a-6f has a downholder 9a-9f by way of which the assigned fiber roving 2a-2f in the region of the respective terminal position Ea-Ef that is freely selectable along the respective path guiding rail 5a-5f can be pressed against the depositing face 3. Furthermore, each cutting unit 7a-7f has a downholder 10a-10f by way of which the assigned fiber roving 2a-2f in the region of the cutting position Sa-Sf that is freely selectable along the respective path guiding rail 5a-5f can be pressed against the depositing face 3.

It is to be noted that the gripper units 6a-6f and the cutting units 7a-7f of each of the path guiding rails 5a-5f are capable of being controlled independently of one another in such a manner that the cutting position Sa-Sf and the terminal position Ea-Ef is approached for the respective assigned fiber roving 2a-2f so as to correspond to the desired length of the portion of the fiber roving 2a-2f and the position thereof on the depositing face 3.

The various steps in the generation and the depositing of a portion Ac of the fiber roving 2c will be explained in more detail hereunder. The steps shown in FIGS. 1a to 1e apply in analogous manner to the other fiber rovings 2a, 2b, 2d, 2e, and 2f.

Accordingly, all reference signs in the context of the processing of the fiber roving 2c are provided with a "c".

The gripper unit 6c collects the free end 14.1c of the fiber roving 2c from the transfer installation 8c. To this end, the gripper unit 6c grips the free end 14.1c of the fiber roving 2c and a clamping installation 11c of the transfer installation 8c releases the free end 14.1c (see FIG. 1 a). The clamping installation 11c is a special embodiment for the holding installation.

The gripper unit 6c erects the fiber roving 2c in a unidirectional direction in the longitudinal direction of said fiber roving above the depositing face 3 in that the gripper unit 6c moves away (in the direction of the arrow L) from the functional group composed of the cutting unit 7c and the transfer installation 8c. During the movement of the gripper unit 6c, the functional group of the cutting unit 7c and the transfer installation 8c can also move in the direction of the arrow L (see FIG. 1b). On account of the gripper unit 6c moving away from the transfer installation 8c, a tensile force is exerted on the fiber roving 2c in the longitudinal direction thereof, and presently on account thereof part of the fiber roving 2c is simultaneously retrieved from the supply device 4.

The gripper unit 6c, in a manner corresponding to the desired length of the portion Ac to be formed and the position of the latter on the depositing face 3, moves up to a terminal position Ec and the functional group of the cutting unit 7c and the transfer installation 8c moves up to a position at which the desired cutting position Sc is attained (see FIG. 1c).

The fiber roving 2c is kept tensioned during the preceding steps.

The two downholders 9c, 10c, that is to say the downholder 9c of the gripper unit 6c and the downholder 10c of the cutting unit 7c, simultaneously press the fiber roving 2c onto the depositing face 3 and the cutting unit 7c severs the fiber roving 2c at the cutting position Sc that is disposed between the terminal position Ec of the gripper unit 6c and the transfer installation 8c, on account of which the portion Ac of the fiber roving 2c and a new free end 14.2c of the fiber roving 2c are formed (see FIG. 1d).

The gripper unit 6c releases the free end 14.1c of the fiber roving 2c and the portion Ac of the fiber roving 2c formed lies completely on the depositing face (see FIG. 1e).

Proceeding from the new free end 14.2c, the preceding steps can be repeated in order for a further portion to be formed from the fiber roving 2c.

FIG. 3 shows a first tier of a textile planar structure F produced by the device according to the invention of FIGS. 1 and 2. To be seen are the portions Aa-Af deposited beside one another on the depositing face 3 of the fiber rovings 2c, specifically the portion Aa that is formed from the fiber roving 2a, the portion Ab that is formed from the fiber roving 2b, the portion Ac that is formed from the fiber roving 2c, the portion Ad that is formed from the fiber roving 2d, the portion Ae that is formed from the fiber roving 2e, and the portion Af that is formed from the fiber roving 2f. It is to be noted that the gap between the portions Aa-Af is illustrated only for improved illustration of the individual portions Aa-Af and is not caused by the device according to the invention or the method. It can be seen that the textile planar structure F has a shape so as to correspond approximately to the contour of the desired shape of the component to be produced. A further tier of the textile planar structure can be generated by rotating the depositing face about the rotation axis D, the portions of said further tier in terms of the length thereof extending at a predefined angle relative to the portions Aa-Af of the tier shown in FIG. 3.

FIG. 4 shows a further device in a plan view from above onto the depositing face 3. Only the points of differentiation in comparison to the device of FIGS. 1 and 2 are to be explained hereunder.

Figure 5:
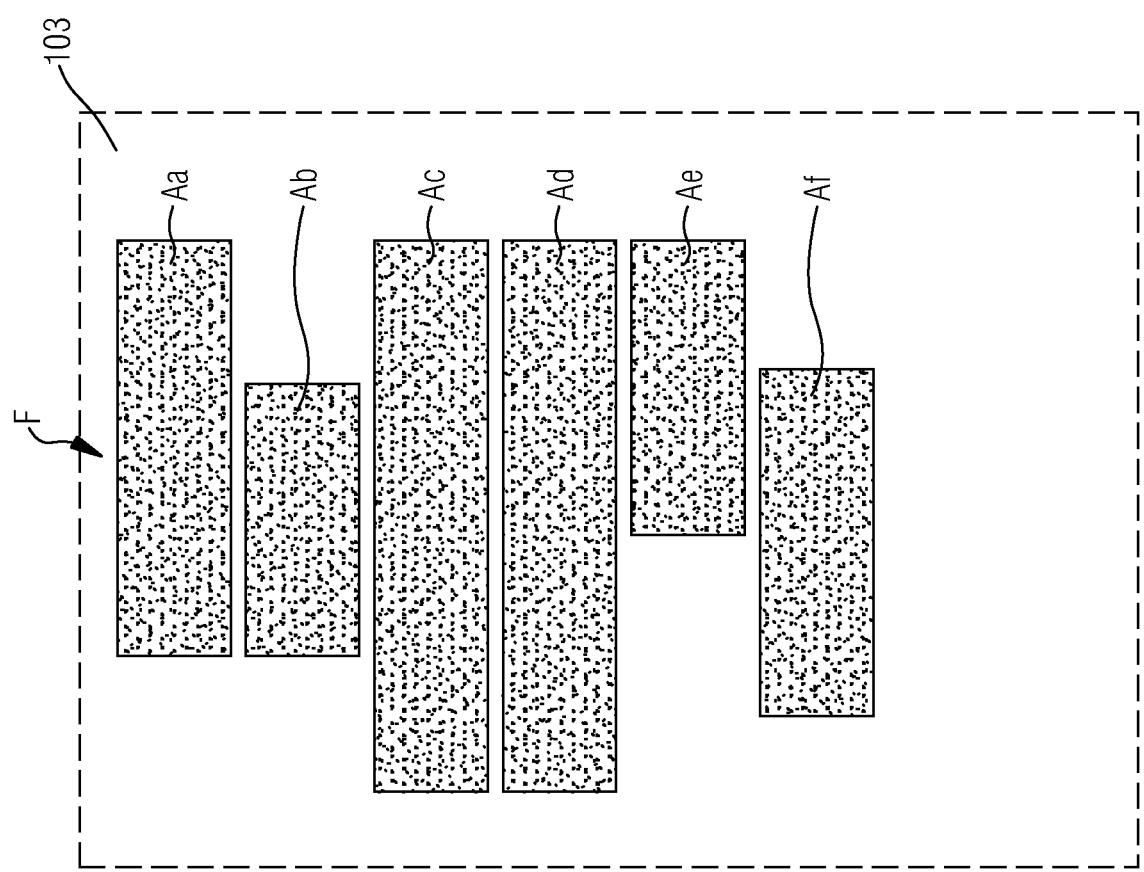
FIG. 5 shows a first tier of a textile planar structure produced by the device according to the invention of FIG. 4.

The device 101 shown in FIG. 4 has only one (single) path guiding rail 105 with an assigned gripper unit 106, a cutting unit 107, and a transfer installation 108, which process only one single fiber roving 102. Consequently, all portions Aa-Af are sequentially formed from the one fiber roving 102, as has been described in FIG. 1, and are deposited beside one another onto the depositing face 103. In order for the depositing in a side-by-side manner on the depositing face 103 to be enabled, the depositing face 103 in the present exemplary embodiment is movable in a translatory manner in a direction T relative to the path guiding rail 105, specifically in a direction which runs obliquely, presently perpendicularly, to the path guiding rail 105. On account of this translatory movement in the direction T, a textile planar structure F that comprises a plurality of portions Aa-Af deposited beside one another can be produced by only one path guiding rail 105 with an assigned gripper unit 106, cutting unit 107, and transfer installation 108. Accordingly, the first tier, shown in FIG. 5, of the textile planar structure produced by the device of FIG. 4 can be configured in a manner identical to that of the textile planar structure of FIG. 3.

The invention claimed is:

1. A device for producing textile planar structures, the device comprising:
 a depositing face for depositing thereon a plurality of portions of fiber rovings beside one another;
 a supply device for providing a plurality of fiber rovings and at least one transfer installation for providing a free end of the fiber rovings;
 a plurality of path guiding rails disposed beside one another and above said depositing face, and one gripper unit and one cutting unit disposed on each of said path guiding rails,
  wherein each gripper unit is movably mounted and positionable along said path guiding rail independently of said gripper units of other path guiding rails;
  wherein each cutting unit is movably mounted and positionable along said path guiding rail independently of said cutting units of other path guiding rails;
  wherein said gripper unit and said cutting unit that are disposed on a respective said path guiding rail are movably mounted and positionable along the respective said path guiding rail independently of one another; and
  wherein said gripper unit and said cutting unit of a respective path guiding rail are collectively assigned one of the fiber rovings so as to process the respectively assigned fiber roving;
 said gripper units being configured for:
  gripping the free end of the respectively assigned fiber roving and acquiring the free end from said transfer installation;
  stretch the assigned fiber roving across said depositing face by moving along the path guiding rail, while keeping hold of the free end, away from said transfer installation up to a desired terminal position and thereby exerting a tensile force on the respectively assigned fiber roving in a longitudinal direction thereof; and
  releasing and depositing the free end on said depositing face at the terminal position of said gripper unit;
 said cutting units being configured for severing at least one of the stretched fiber rovings at a cutting position to form the portion of the respective fiber roving, wherein the cutting position in a stretched state of the fiber roving assigned to the gripper unit is located between said transfer installation and said terminal position; and
 each of said gripper units including a downholder configured for pressing the fiber roving against the depositing face in a region of the respective terminal position; and
 each of said cutting units including a downholder configured for pressing the fiber roving against the depositing face in a region of the respective cutting position.

2. The device according to claim 1, which comprises at least four of said path guiding rails are disposed beside one another, each having one gripper unit and each having one cutting unit.

3. The device according to claim 1, wherein at least one of the terminal position of the respective said gripper unit or the cutting position of the respective said cutting unit is disposed above said depositing face and is freely selectable so as to correspond to a desired contour of the planar structure.

4. The device according to claim 1, wherein said gripper units and said cutting units of said guide rail are controllable independently of one another such that the cutting position and the terminal position are approached for the respective assigned fiber roving so as to correspond to a desired length of the portion of the respective fiber roving and the position thereof on the depositing face.

5. The device according to claim 1, wherein said downholders of said gripper units and/or said downholders of said cutting units are configured to press all fibers in the respectively assigned fiber roving onto said depositing face.

6. The device according to claim 1, wherein said depositing face is rotatable about a rotation axis that runs obliquely to said depositing face.

7. The device according to claim 1, wherein said depositing face is rotatable about a rotation axis that runs perpendicularly to said depositing face.

8. The device according to claim 1, wherein said depositing face is movable in translation relative to said path guiding rails oliquely to said path guiding rails.

9. The device according to claim 1, wherein said depositing face is movable in translation relative to said path guiding rails perpendicularly to said path guiding rails.

10. The device according to claim 1, wherein said downholder of said gripper unit is one of a plurality of downholders and said downholder of said cutting unit is one of plurality of downholders, and wherein said downholders that are assigned to the same path guiding rail are configured and controllable to simultaneously press the fiber roving against said depositing face.

11. The device according to claim 1, wherein said transfer installation includes a plurality of clamping installations configured to selectively hold the fiber roving and release the fiber roving.

12. The device according to claim 11, wherein each of said clamping installations is configured to keep hold of the free end of a respective fiber roving until the free end is gripped by the assigned said gripper unit.

13. The device according to claim 1, wherein each said cutting unit is associated with a dedicated transfer unit.

14. The device according to claim 13, wherein at least one of said cutting units an a respectively assigned transfer unit form a functional group that is collectively movable along a respective said path guiding rail.

15. The device according to claim 1, wherein said supply device comprises one or a plurality of unwinding stations, from which the at least one fiber roving, which is present in wound form, is unwindable.

16. The device according to claim 15, wherein each of said unwinding stations is assigned one fiber roving.

17. The device according to claim 15, wherein each said unwinding station is configured to control or closed-loop control the tension on the respective roving independently of other fiber rovings.

18. The device according to claim 1, wherein at least one of the following is true:
   said path guiding rails run parallel to one another;
   said path guiding rails run linearly parallel to one another; and
   said path guiding rails run in a plane parallel to said depositing face.

* * * * *